Patented Jan. 5, 1937

2,067,060

UNITED STATES PATENT OFFICE 2,067,060

METHOD OF TREATING PIGMENTS

Henry R. Minor, Oak Park, Ill., assignor, by mesne assignments, to Industrial Process Corporation, Saratoga Springs, N. Y., a corporation of New York No Drawing. Application April 6, 1934, Serial No. 719,339

6 Claims. (Cl. 134—58)

This invention relates to a method of treating pigments to obtain a uniform dispersion of a relatively small quantity of a treating agent throughout the mass of the pigments. More particularly, the invention relates to the treatment of carbon black with wetting or rubber softening agents by the use of carbon dioxide as a carrier and dispersion vehicle, in order to facilitate the incorporation of the treated carbon black into rubber.

In its more general aspect, the invention relates to the dispersion of a treating agent that is volatile under the conditions obtaining, throughout a mass of a pulverulent solid, such as a pigment or the like, in order to uniformly coat or impregnate the solid with a relatively small proportion of the treating agent. The various methods heretofore devised for accomplishing this purpose, in general, have included the spraying of liquid treating agents into an air or gas suspended mass of the pulverulent solids and also the dispersion of the liquid treating agent in a more volatile solvent throughout a mass of pulverulent solids and then evaporating the more volatile carrier.

According to my present invention, relatively small proportions of treating agents that are liquid or may be volatilized under the conditions obtaining in my treating method, are dispersed throughout a mass of pulverulent solids, such as pigments and the like, by the use of carbon dioxide under pressure and at an elevated temperature as a carrying and dispersing medium. This method is particularly applicable to the treatment of carbon black with agents customarily used for the softening of rubber or for improvement of the dispersion of the carbon black, in order to uniformly disperse the treating agent throughout the mass of carbon black and impart thereto improved commercial characteristics.

The milling of carbon black into raw rubber in substantial proportions, according to present methods, entails considerable difficulty, due to the tendency of the stock to scorch, blister and dry-lap in the mill. Wetting and softening agents have been used along with the carbon black to promote the latter's dispersion in the mix and to soften the rubber, but even with the use of such agents, the results have not been entirely satisfactory when following the customary procedure. The quantities of carbon or gas black, for example, which may be successfully milled into rubber stock are limited because of this tendency of the stock to scorch, blister or dry-lap in the mill and in the subsequent calendering or sheeting operation.

The preliminary treatment of carbon black, or other pigments, with wetting and rubber softening agents by the use of carbon dioxide gas as a carrier and dispersion vehicle obviates many of these difficulties by facilitating the incorporation of the treated carbon black and other pigments into rubber stock in the usual milling operation.

It is therefore an object of this invention to provide a method for impregnating a relatively large mass of pulverulent solids with treating agents by the use of carbon dioxide gas under pressure and at an elevated temperature as a carrier and dispersing vehicle.

It is a further important object of this invention to provide a method for treating carbon black and other pigments so as to facilitate their incorporation into rubber products.

It is a further important object of this invention to provide a method for uniformly coating or impregnating carbon black with rubber softening agents, whereby greater quantities of this pigment may be more readily incorporated into rubber stock.

It is a further important object of this invention to provide a treated carbon black that does not dust objectionably when handled in the ordinary manner in the processing of rubber.

Other and further important objects of this invention will become apparent from the following description and appended claims.

In accordance with the present invention, a mass of the pulverulent solids that is desired to be impregnated with a treating agent is subjected to the action of carbon dioxide gas under pressures substantially higher than atmospheric and at sufficiently elevated temperatures to volatilize the treating agent that is present. Under these conditions, the carbon dioxide gas serves as a carrying and dispersing vehicle to distribute the treating agent uniformly throughout the mass of the pulverulent solids, even although the treating agent may be present in relatively minor proportions.

In view of its particular applicability to the treatment of carbon black and other pigments, such as clay, zinc oxide, ferric oxide, titanium dioxide, barium sulphate and the like, for incorporation into rubber, the invention will be described more specifically in connection with the treatment of carbon black. In carrying out my invention, the carbon black, together with the requisite amount of the desired treating agent, is introduced into a vessel from which air may or may not have been evacuated. Carbon dioxide is then introduced into the vessel and is suitably maintained therein at a pressure of between 25 and 100 lbs. per sq. in., and preferably at about 50 lbs. per sq. in. Pressures in excess of 100 lbs. per sq. in. give no especial added advantage.

The vessel may be heated, as by steam jacketed walls, to a temperature equivalent to that of steam at 100 lbs. per sq. in. pressure and over, viz., to temperatures in excess of about 330° F. It is not necessary, however, in order to obtain some of the advantages of this invention, to employ temperatures as high as indicated, but the temperatures used should in any event be sufficiently high to cause the volatilization of the treating agents in the presence of the carbon dioxide gas.

Where carbon black is being treated, the use of the higher temperatures, such as those equivalent to steam at 100 lbs. per sq. in. pressure and over, impart improved properties to the carbon black in connection with its incorporation into rubber stock. The pressure, temperatures and times employed may be varied, as will be understood by skilled artisans, but a pressure of 50 lbs. per sq. in., a temperature of 330 to 340° F. and a heating period of between 2 and 3 hours have been successfully used. In general, as above stated, the temperatures employed in my process are above the volatilization point of the treating agents used.

Various wetting, and/or softening agents which are liquid and/or are volatile under the conditions obtaining may be incorporated into the carbon black by the use of carbon dioxide as a carrier. Among the various treating agents may be mentioned oleic acid, pine oil, stearic acid, acetic acid, and others. These are introduced in quantities equal to approximately 2 to 15% by weight of the carbon black. Where the treating agents are liquid, they may be poured over the mass of carbon black in the proper proportion either before or after the carbon black has been introduced into the pressure vessel. The carbon dioxide under pressure during the heat treatment of the carbon black picks up the treating agent and, in penetrating the mass of carbon black, apparently carries with it the volatilized treating agent.

Then, upon release of the pressure, the treating ingredients remain behind substantially uniformly dispersed throughout the carbon black, while the carbon dioxide is given off. The attraction of the carbon black particles for these treating agents is apparently greater than the attraction of the carbon dioxide for the treating agents. It may be that the treating agents are actually condensed upon the surfaces of the carbon particles, and either adsorbed or absorbed thereby.

As an example of the effect of treating carbon black with liquid and/or volatile ingredients using carbon dioxide gas as a carrier, the following is given:

To 100 parts of carbon black are added 5 parts by weight of oleic acid and the resulting mass subjected to carbon dioxide gas in a confined vessel under a pressure of approximately 50 lbs. per sq. in. and at a temperature equivalent to that of steam at 100 lbs. per sq. in. pressure for a period of 2 hours. At the end of that period, the pressure is released and the treated carbon black removed and incorporated in the usual manner into raw rubber stock on a mill.

Upon comparison between the rubber stock thus produced and rubber stock of similar composition prepared in the usual manner by adding the same proportion of oleic acid in the mill, it was found that the rubber stock prepared in the usual fashion had a tensile strength of 3475 lbs. per sq. in. and an elongation of 645%, whereas the rubber stock prepared from carbon black treated in accordance with the above example had a tensile strength of 3880 lbs. per sq. in. and an elongation of 645%, thus indicating substantial improvement in physical properties.

In addition to the substantial physical improvement obtained in the cured rubber product, as a result of this preliminary treatment of carbon black with a rubber softening agent, there are also added advantages. For instance, carbon black treated in accordance with the method described does not fly into dust to the same extent as when used in the ordinary fashion, and this in itself is a matter of great importance in the rubber industry, where at present ventilation and recovery devices are installed in many instances to recover the large percentage of dust floating in the air. It has not heretofore been possible to prevent this loss, which is now eliminated as a result of my method of prior incorporation of the treating material in the carbon black. Such incorporation of ingredients into the carbon black not only adds to the value of the material itself but tends to give substantial processing advantages.

It will be understood that the method described in connection with the impregnation of carbon black and other pigments with treating agents volatile under the conditions obtaining may also be applied in a similar manner to the impregnating of masses of pulverulent solids with liquids and other volatilizable treating agents.

For instance, paint pigments may be impregnated in a similar manner with suitable wetting or emulsifying agents, such as the ethanolamines, tri-ethanolamine and the like, prior to incorporation into paint vehicles. Triethanolamine has the property of removing water and also of absorbing carbon dioxide, with the result that it aids the dispersion of the pigments in the paint vehicle.

I am aware that numerous details of the process may be varied through a wide range without departing from the principles of this invention, and I, therefore, do not purpose limiting the patent granted hereon otherwise than necessitated by the prior art.

I claim as my invention:

1. The method of coating particles of pulverulent material with a dispersing agent comprising adding the dispersing agent to a mass of the pulverulent material, introducing the mixture of pulverulent material and dispersing agent into a chamber, heating the mixture of dispersing agent and pulverulent material in an atmosphere of carbon dioxide to volatilize the dispersing agent while maintaining a pressure of between 25 and 100 lbs. per square inch in said chamber, cooling the pulverulent material and restoring the pressure in the chamber to atmospheric preessure, whereby the dispersing agent is caused to coat the particles of the pulverulent material.

2. The method of coating particles of pulverulent material with a dispersing agent comprising adding the dispersing agent to a mass of the pulverulent material, introducing the mixture of pulverulent material and dispersing agent into a chamber, substantially evacuating the air in said chamber, establishing an atmosphere of carbon dioxide in the chamber and heating the mixture of pulverulent material and dispersing agent to volatilize the dispersing agent while maintaining a pressure of between 25 and 100 lbs. per square inch in said chamber, cooling the pulverulent material and restoring the pressure in the chamber to atmospheric pressure, whereby the dispersing agent is caused to coat the particles of the pulverulent material.

3. The method of coating particles of carbon black with a dispersing agent comprising adding the dispersing agent to a mass of the carbon black, introducing the mixture of carbon black and dispersing agent into a chamber, heating the mixture of dispersing agent and carbon black in an atmosphere of carbon dioxide to volatilize the dispersing agent while maintaining a pressure of between 25 and 100 lbs. per square inch in said chamber, cooling the carbon black and restoring the pressure in the chamber to atmospheric pressure, whereby the dispersing agent is caused to coat the particles of the carbon black.

4. The method of coating particles of pulverulent material with a dispersing agent comprising adding the dispersing agent to a mass of the pulverulent material, introducing the mixture of pulverulent material and dispersing agent into a chamber, heating the mixture of dispersing agent and pulverulent material in an atmosphere of carbon dioxide to volatilize the dispersing agent while maintaining a pressure of about 50 lbs. per square inch in said chamber, cooling the pulverulent material and restoring the pressure in the chamber to atmospheric pressure, whereby the dispersing agent is caused to coat the particles of the pulverulent material.

5. The method of coating particles of carbon black with a dispersing agent comprising adding the dispersing agent to a mass of carbon black, introducing the mixture of carbon black and dispersing agent into a chamber, heating the mixture of carbon black and dispersing agent in an atmosphere of carbon dioxide to volatilize the dispersing agent while maintaining a pressure of about 50 lbs. per square inch in said chamber, cooling the carbon black and dispersing agent, and restoring the pressure in the chamber to atmospheric pressure, whereby the dispersing agent is caused to coat the particles of the carbon black.

6. The method of coating particles of carbon black with a dispersing agent comprising adding the dispersing agent to a mass of the carbon black, introducing the mixture of carbon black and dispersing agent into a chamber, substantially evacuating the air in said chamber, establishing an atmosphere of carbon dioxide in the chamber and heating the mixture of carbon black and dispersing agent to volatilize the dispersing agent while maintaining a pressure of about 50 lbs. per square inch in said chamber, cooling the carbon black and dispersing agent, and restoring the pressure in the chamber to atmospheric pressure, whereby the dispersing agent is caused to coat the particles of the carbon black.

HENRY R. MINOR.